United States Patent
Liu et al.

(10) Patent No.: US 9,521,251 B2
(45) Date of Patent: Dec. 13, 2016

(54) METHOD AND DEVICE FOR IDENTIFYING TELEPHONE CALL

(71) Applicant: Xiaomi Inc., Beijing (CN)

(72) Inventors: Yuxiang Liu, Beijing (CN); Zhiyong Bai, Beijing (CN); Zhongliang Qiao, Beijing (CN); Botian Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/610,293

(22) Filed: Jan. 30, 2015

(65) Prior Publication Data
US 2016/0021244 A1    Jan. 21, 2016

Related U.S. Application Data

(63) Continuation of application No. PCT/CN2014/091543, filed on Nov. 19, 2014.

(30) Foreign Application Priority Data

Jul. 21, 2014 (CN) .......................... 2014 1 0347054

(51) Int. Cl.
*H04M 3/42* (2006.01)
*H04M 1/57* (2006.01)
*H04W 4/12* (2009.01)

(52) U.S. Cl.
CPC ......... *H04M 3/42042* (2013.01); *H04M 1/575* (2013.01); *H04W 4/12* (2013.01)

(58) Field of Classification Search
CPC ..... H04M 3/42042; H04M 1/575; H04W 4/12
(Continued)

(56) References Cited

U.S. PATENT DOCUMENTS 5,748,713 A    5/1998 Kovacs, Jr.
5,953,399 A    9/1999 Farris et al.
(Continued)

FOREIGN PATENT DOCUMENTS

CN    1146696 A    4/1997
CN    1859749 A    11/2006
(Continued)

OTHER PUBLICATIONS

Extended European Search Report dated Nov. 20, 2015 for European Application No. 15175499.1, 7 pages.
(Continued)

*Primary Examiner* — Khai M Nguyen
(74) *Attorney, Agent, or Firm* — Brinks, Gilson & Lione

(57) ABSTRACT

The present disclosure relates to a method and a device for identifying a telephone call. The method includes: determining whether a second telephone of an assigned entity, which entity a telephone number of a caller is affiliated with, is calling a telephone number of a first telephone, when the caller is calling the telephone number of the first telephone, wherein the telephone number of the second telephone is the telephone number used by the caller; when the second telephone is not calling the telephone number of the first telephone, outputting prompt information, wherein the prompt information is for indicating that the telephone call from the caller is a number-falsified telephone call. The present invention may correctly identify whether a telephone call is a number-falsified telephone call.

21 Claims, 7 Drawing Sheets

(58) Field of Classification Search
USPC .................. 455/415, 418, 419, 414.1, 550.1
See application file for complete search history.

(56) References Cited

U.S. PATENT DOCUMENTS

| | | | |
|---|---|---|---|
| 8,135,119 | B1 | 3/2012 | Zhao et al. |
| 9,071,683 | B1* | 6/2015 | Somes ............... H04M 3/42059 |
| 2001/0016507 | A1* | 8/2001 | Karusawa ............... H04M 1/57 |
| | | | 455/575.1 |
| 2007/0127658 | A1 | 6/2007 | Gruchala et al. |
| 2008/0159501 | A1 | 7/2008 | Cai |
| 2009/0217039 | A1* | 8/2009 | Kurapati ............... H04L 63/126 |
| | | | 713/168 |
| 2011/0294478 | A1* | 12/2011 | Trivi ..................... H04M 3/436 |
| | | | 455/415 |
| 2012/0287823 | A1* | 11/2012 | Lin .................. H04M 3/42042 |
| | | | 370/259 |
| 2014/0328478 | A1* | 11/2014 | Chen ..................... H04M 3/436 |
| | | | 379/142.06 |
| 2015/0087280 | A1* | 3/2015 | Farrand ................. H04M 3/436 |
| | | | 455/415 |

FOREIGN PATENT DOCUMENTS

| | | |
|---|---|---|
| CN | 101262520 A | 9/2008 |
| CN | 101569166 A | 10/2009 |
| CN | 102075940 A | 5/2011 |
| CN | 103095690 A | 5/2013 |
| CN | 103634450 A | 3/2014 |
| EP | 2 863 660 A1 | 4/2015 |
| KR | 10-0661503 | 12/2006 |
| KR | 10-1129839 | 3/2012 |
| KR | 10-2014-0072498 | 6/2014 |
| RU | 2 429 589 C2 | 9/2011 |
| RU | 2011 106 288 A | 8/2012 |
| WO | WO 2007/064686 A2 | 6/2007 |
| WO | WO 2012/154730 A1 | 11/2012 |
| WO | WO 2014/012398 A1 | 1/2014 |

OTHER PUBLICATIONS

International Search Report dated Apr. 13, 2015 for International Application No. PCT/CN2014/091543, 5 pages.
Notice of Allowance dated May 5, 2016 for Russian Application No. 2015103188/07, 13 pages.
Office Action dated May 16, 2016 for Korean Application No. 10-2015-7001337, 5 pages.

* cited by examiner

METHOD AND DEVICE FOR IDENTIFYING TELEPHONE CALL

PRIORITY STATEMENT

This application is a continuation in part of International Application No. PCT/CN2014/091543, filed Nov. 19, 2014, which is based upon and claims priority to Chinese Patent Application No. 201410347054.5, filed on Jul. 21, 2014, the entire contents of which are incorporated herein by reference.

TECHNICAL FIELD

The present disclosure generally relates to the technology field of communication. Specifically, the present disclosure relates to methods and devices for identifying a telephone call.

BACKGROUND

A number-falsified incoming telephone call refers to a telephone call made by a criminal who, by taking advantages of flaws of telecom operating systems, masquerades as any one number to call someone else to engage in fraudulent conduct.

The following is a technology of number-falsified phone call often used by criminals. The criminal (i.e., caller) sends to a telecom operator a fake identity, such as "110" (police), using a telephone interface of Voice Over Internet Protocol (short for VOIP). The telecom operator directly conveys the identity to the telephone called party (i.e., callee) as the incoming phone number. The incoming call is directly displayed as "110" to the callee, which makes the callee unable to determine whether the call is an authentic call or a deceptive call. Currently, a main technology for preventing deceptive callings is based on telephone number coding rules. For example, when some deceptive calls are from abroad through VOIP, they may have a prefix, such as "00192," shown to the calling number during transmission. Related technologies may identify such prefix so as to determine whether the incoming call is a number-falsified incoming telephone call.

SUMMARY

The present disclosure provides methods and devices for identifying an incoming telephone call. The technical solutions are set forth as follows.

According to an aspect of the present disclosure, a device may comprise a processor-readable storage medium storing a set of instructions for identifying an incoming telephone call; and a processor in communication with the storage medium. When a caller is calling a first telephone affiliated with a first telephone number using a second telephone number, the processor may execute the set of instructions to determine whether a second telephone affiliated with the second phone number is calling the first telephone number; and when the second telephone is not calling the first telephone number, output prompt information indicating that the telephone call from the caller is a number-falsified telephone call.

According to another aspect of the present disclosure, a method for identifying an incoming telephone call may comprise receiving, by an electronic device, a notification that a caller is calling a first telephone affiliated with a first telephone number using a second telephone number; determining, by the electronic device, whether a second telephone affiliated with the second phone number is calling the first telephone number; and when the second telephone is not calling the first telephone number, outputting, by the electronic device, prompt information indicating that the telephone call from the caller is a number-falsified telephone call.

According to yet another aspect of the present disclosure, a processor-readable storage medium may comprise a set of instructions for identifying an incoming telephone call, wherein when executed by a processor the set of instructions may direct the processor to perform acts of, receiving a notification when a caller is calling a first telephone affiliated with a first telephone number using a second telephone number; determining whether a second telephone affiliated with the second phone number is in fact calling the first telephone number; and when the second telephone is not calling the first telephone number, outputting prompt information indicating that the telephone call from the caller is a number-falsified telephone call.

The technical solutions provided in the embodiments of the present disclosure may include, in part, the following advantageous effects: when the caller is calling the first telephone number of the first telephone using the second telephone number, whether the second telephone of the assigned entity that the second telephone number is affiliated with is indeed calling the telephone number of the first telephone is determined. When the second telephone is not calling the first telephone number, prompt information is output to indicate that the telephone call from the caller is a number-falsified telephone call. Since the second telephone of the assigned entity is an authentic source of the caller, the determination result about whether the second telephone of the assigned entity is calling the first telephone currently is real and effective, and thereby whether the telephone call is number-falsified telephone call may be correctly identified. Meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

It is to be understood that both the foregoing general description and the following detailed description are example and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present invention and, together with the description, serve to explain the principles of the present invention.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

To facilitate understanding of the technical solutions provided by the present disclosure, a telephone call (including VOIP call) process is introduced first. A telephone calling party (such as a telephone A, or a caller) sends a telephone calling request to a server (including a switch) of a telecom operator. The telephone calling request includes a calling telephone number (the telephone number used by the caller, or the caller number or a second telephone number) and a called telephone number (the telephone number of the callee, or the callee number or a first telephone number). The server of the telecom operator obtains a link for arriving the callee (such as a telephone B) according to the called telephone number and transmits the telephone call from the caller to the callee via the link, thereby establishing a telephone call between the caller and the callee.

In the embodiment, the telephone includes telephones such as wired phones, wireless phones and smart phones, and the telephone also includes a VOIP such as a computer and a mobile terminal.

Figure 7:
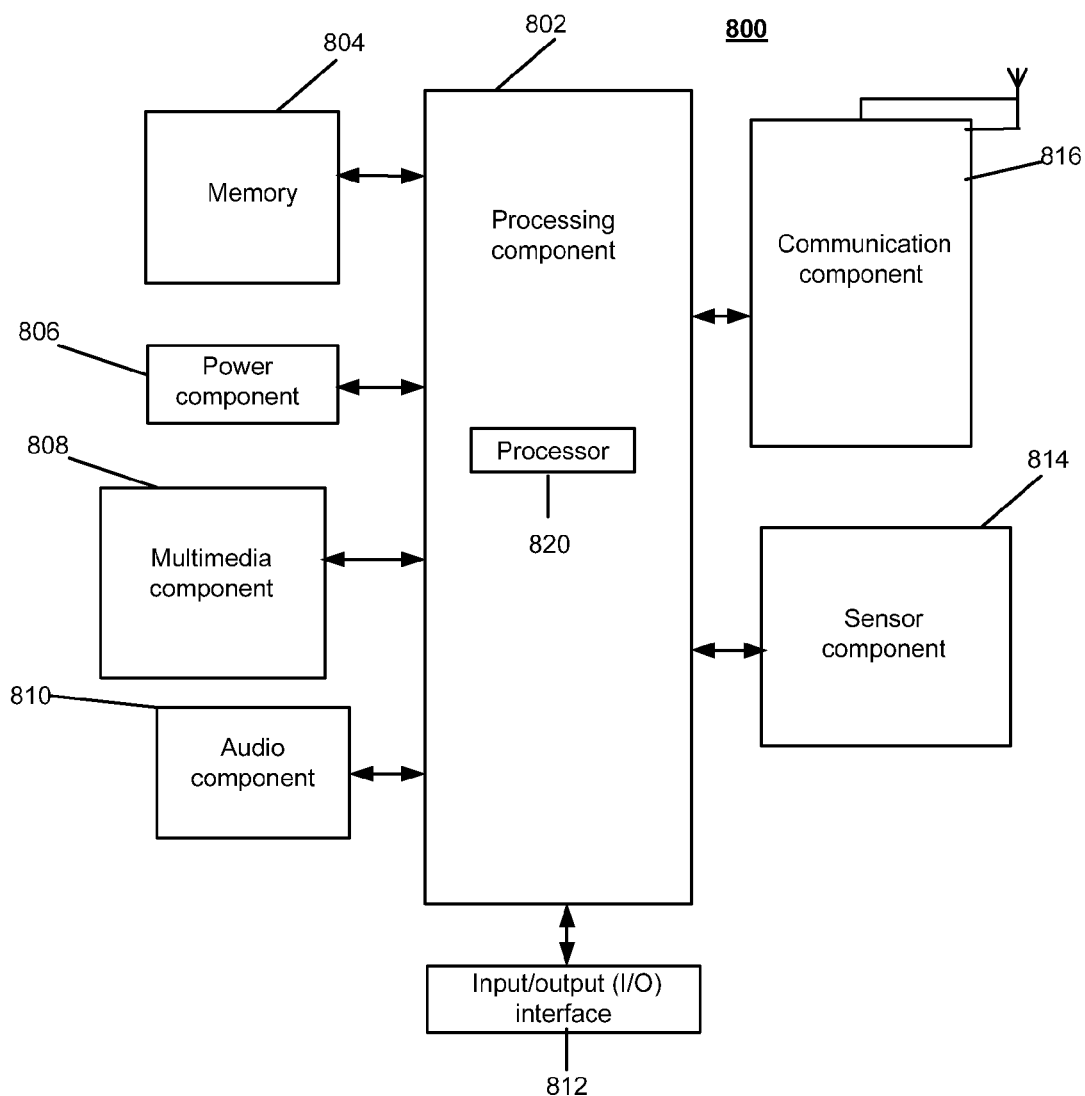
FIG. 7 is a block diagram showing a device for identifying an incoming telephone call according to an example embodiment.

FIG. 7 is a block diagram illustrating a device 800 for identifying a telephone call according to an example embodiment. For example, the device 800 may be a telephone, a VOIP or the like.

The device 800 may include one or more of the following components: a processing component 802, a memory 804, a power component 806, a multimedia component 808, an audio component 810, an input/output (I/O) interface 812, a sensor component 814, and a communication component 816.

The processing component 802 may control overall operations of the device 800, such as operations associated with display, telephone calls, data communications, camera operations and recording operations. The processing component 802 may include one or more processors 820 to execute instructions to perform all or a part of operations of methods introduced in the present disclosure. Moreover, the processing component 802 may include one or more modules which facilitate interactions between the processing component 802 and other components. For example, the processing component 802 may include a multimedia module to facilitate the interaction between the multimedia component 808 and the processing component 802.

The memory 804 may be configured to store various types of data to support the operation of the device 800. Examples of such data include instructions for any application or method operated on the device 800, contact data, phonebook data, messages, pictures, videos, etc. The memory 804 may be implemented by any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or optical disk.

The power component 806 may provide power to various components of the device 800. The power component 806 may include a power management system, one or more power sources, and other components associated with the generation, management, and distribution of power in the device 800.

The multimedia component 808 may include a screen for providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 may include a front camera and/or a rear camera. The front camera and/or the rear camera may receive external multimedia data while the device 800 is in an operation mode, such as a photographing mode or a video mode. Each of the front camera and the rear camera may be a fixed optical lens system or have focus and optical zoom capability.

The audio component 810 may be configured to output and/or input audio signals. For example, the audio component 810 may include a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 may further include a speaker to output audio signals.

The I/O interface 812 may provide an interface between the processing component 802 and peripheral interface modules, such as a keyboard, a click wheel, a button, and the like. The button may include, but not limited to: a home button, a volume button, a starting button and a locking button.

The sensor component 814 may include one or more sensors to provide status assessments of various aspects of the device 800. For example, the sensor component 814 may detect an open/closed status of the device 800, relative position of components, e.g., the display and the keyboard, of the device 800, a change in position of the device 800 or a component of the device 800, a presence or absence of an user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 may be configured to facilitate communication, in a wire or wireless manner, between the device 800 and other devices. The device 800 may access a wireless network based on a communication standard, such as WiFi, 2G, 3G or 4G, or a combination thereof. In one example embodiment, the communication component 816 may receive a broadcast signal or broadcast associated information from an external broadcast management system via a broadcast channel. In one example embodiment, the communication component 816 may further include a near field communication (NFC) module to facilitate short-range communications. For example, the NFC module may be implemented based on a radio frequency identification (RFID) technology, an infrared data association (IrDA) technology, an ultra-bandwidth (UWB) technology, a Bluetooth (BT) technology, and other technologies.

In example embodiments, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the below described methods.

In example embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Figure 8:
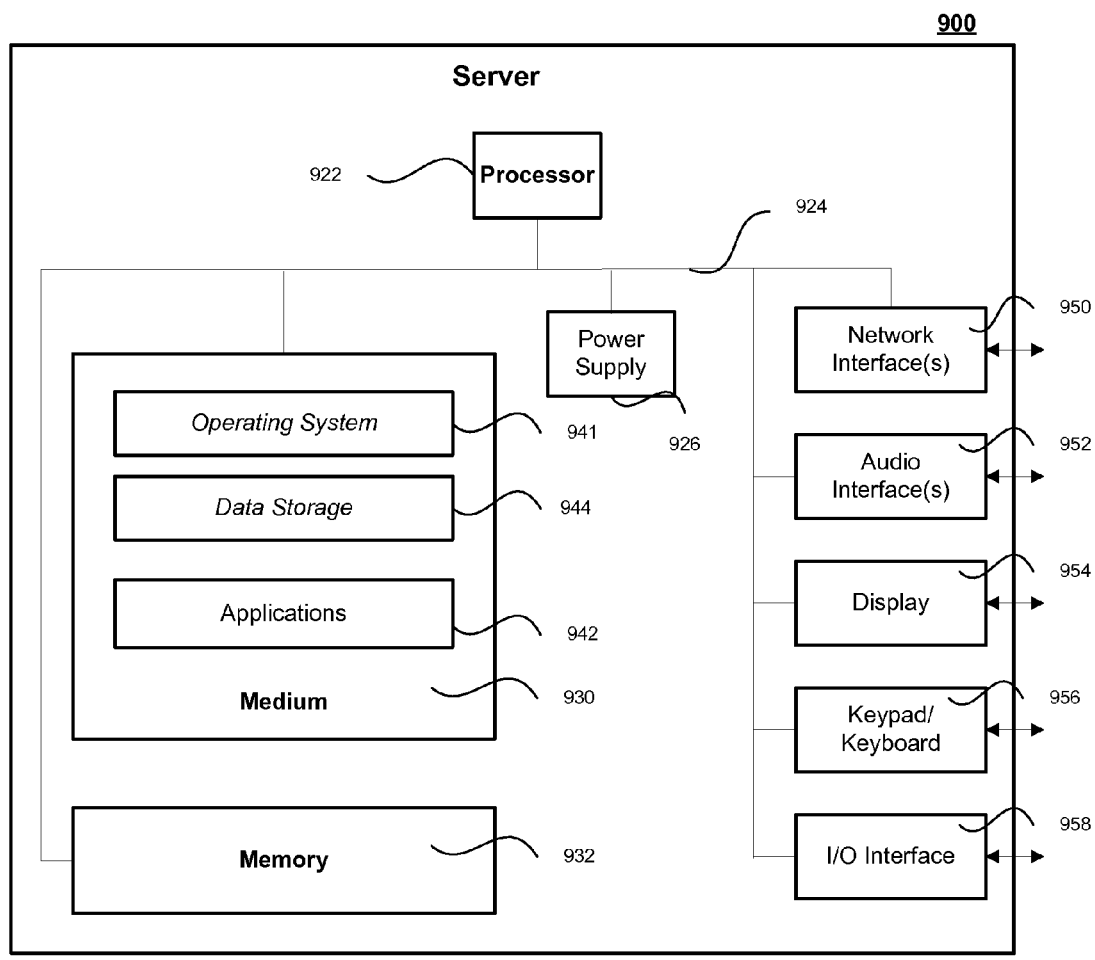
FIG. 8 is a schematic diagram illustrating an example embodiment of a server.

FIG. 8 is a schematic diagram illustrating an example embodiment of a server. The server 900 may be a server as described in the present disclosure and may connect to the device 800 or a telephone locally or via a network. A Server 900 may vary widely in configuration or capabilities, but it may include one or more central processing units 922 and memory 932, one or more medium 930 (such as one or more transitory and/or non-transitory mass storage devices) storing application programs 942 or data 944. The processing units 922 may execute the application programs 942 or data 944 to perform methods disclosed in the present disclosure.

The server 900 may further include, one or more power supplies 926, one or more wired or wireless network interfaces 950, one or more input/output interfaces 958, and/or one or more operating systems 941, such as Windows Server™, Mac OS X™, Unix™, Linux™, FreeBSD™, or the like. Thus a server 900 may include, as examples, dedicated rack-mounted servers, desktop computers, laptop computers, set top boxes, mobile computational devices such as smart phones, integrated devices combining various features, such as two or more features of the foregoing devices, or the like.

The server 900 may serve as a search server or a content server. A content server may further provide a variety of services that include, but are not limited to, web services, third party services, audio services, video services, email services, instant messaging (IM) services, SMS services, MMS services, FTP services, voice over IP (VOIP) services, calendaring services, photo services, or the like.

Merely for illustration, only one processor will be described in the devices and/or servers that execute operations and/or method operations in the following example embodiments. However, it should be note that the devices and/or servers in the present disclosure may also include multiple processors, thus operations and/or method operations that are performed by one processor as described in the present disclosure may also be jointly or separately performed by the multiple processors. For example, if in the present disclosure a processor of a device executes both operation A and operation B, it should be understood that operation A and operation B may also be performed by two different processors jointly or separately in the device (e.g., the first processor executes operation A and the second processor executes operation B, or the first and second processors jointly execute operations A and B).

Figure 1:
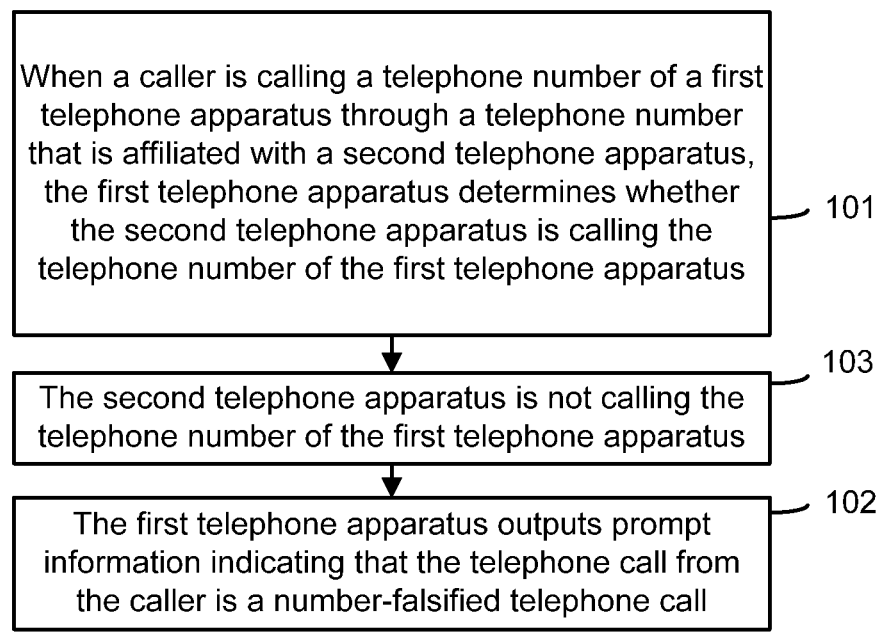
FIG. 1 is a flow chart showing a method for identifying an incoming telephone call according to an example embodiment of the present disclosure.

FIG. 1 is a flow chart showing a method for identifying an incoming telephone call according to an example embodiment. This method may be implemented in a first telephone, such as the device 800. The method may also be implemented in a server (e.g., a cloud server), such as the device 800 and/or the server 900, connecting to the first telephone to provide a service of identifying a telephone call. Merely for illustration, the below description takes an example that the method is implemented in the first telephone as an example. It should be note that the below method may also be implemented in a computer server, such as a cloud server. The method may include the following operations:

In operation 101, when a caller is calling a telephone number of the first telephone (i.e., a callee) through a telephone number that is affiliated with a second telephone, the first telephone may be notified with the phone call and determine whether the second telephone is calling the telephone number of the first telephone.

The telephone number of the second telephone is the telephone number used by the caller.

In operation 103, when the second telephone is not calling the telephone number of the first telephone, the first telephone may perform operation 102. When the second telephone is calling the telephone number of the first telephone, the first telephone may determine that the telephone call from the caller is not a number-falsified telephone call.

In operation 102, the first telephone may output prompt information indicating that the telephone call from the caller is a number-falsified telephone call.

In the embodiment, when a caller is calling a telephone number of a first telephone, whether a second telephone of an assigned entity, which entity a telephone number used by the caller is affiliated with, is calling the telephone number of the first telephone is determined; the telephone number of the second telephone is the telephone number used by the caller; when the second telephone is not calling the telephone number of the first telephone, prompt information is output; the prompt information is for indicating that the telephone call from the caller is a number-falsified telephone call; since the second telephone of the assigned entity is the authentic source of the caller, the determination result about whether the second telephone of the assigned entity is calling the callee currently is real and effective, and thereby whether the telephone call is number-falsified telephone call may be correctly identified; meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

Figure 2:
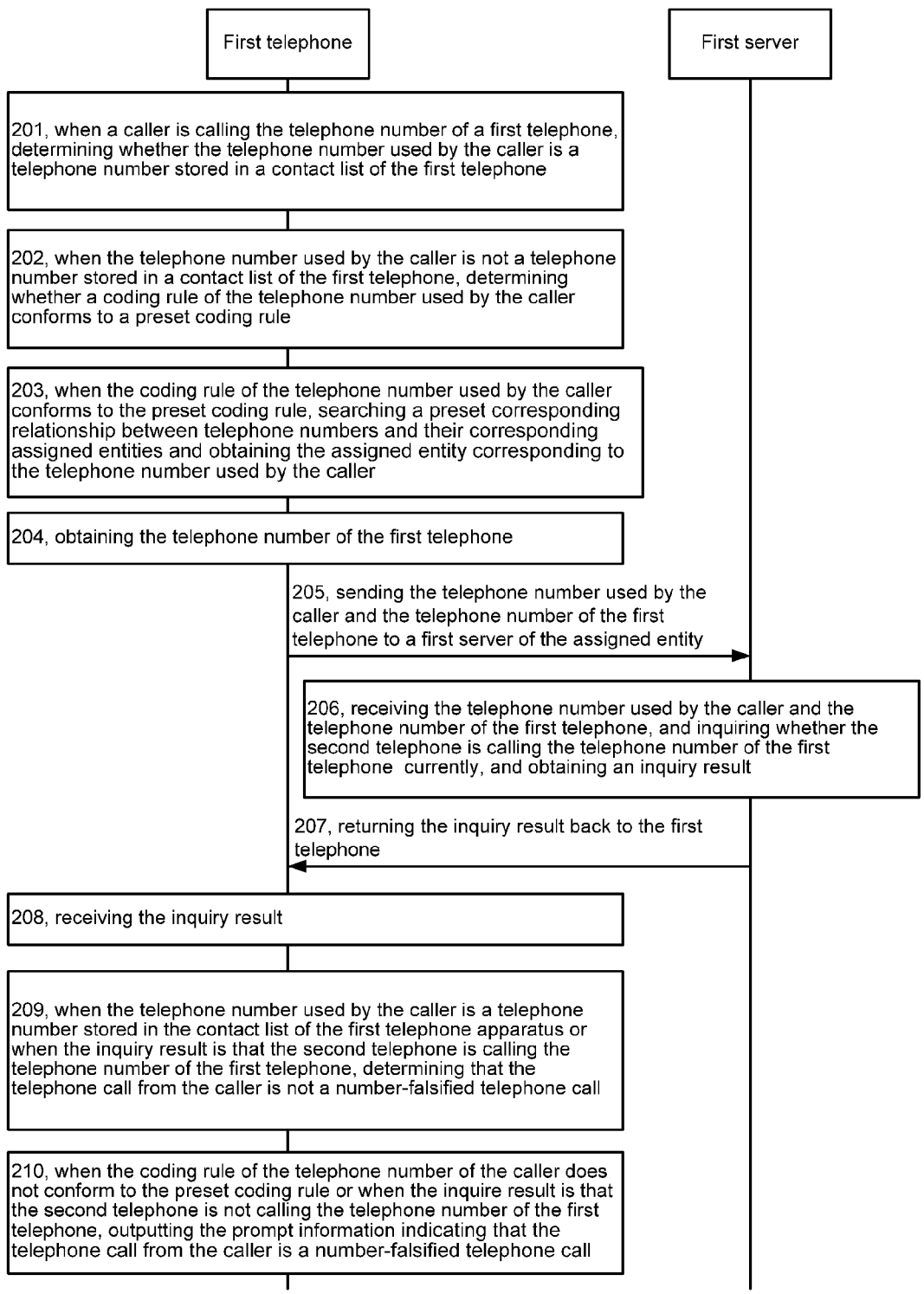
FIG. 2 is a flow chart showing another method for identifying an incoming telephone call according to an example embodiment of the present disclosure.

FIG. 2 is a flow chart showing a method for identifying an incoming telephone call according to an example embodiment. This method may be implemented in a first telephone, such as the device 800. The method may also be implemented in a server (e.g., a cloud server), such as the device 800 and/or the server 900, connecting to the first telephone to provide a service of identifying a telephone call. Merely for illustration, the below description takes an example that the method is implemented in the first telephone as an example. It should be note that the below method may also be implemented in a computer server, such as a cloud server. The method may include the following operations:

In operation 201, when the caller is calling the telephone number (i.e., a first phone number) of the first telephone (i.e., the callee), the first telephone may be notified with the phone call and determine whether the telephone number (i.e., a second phone number) used by the caller is a telephone number stored in a contact list of the first telephone.

When the telephone number used by the caller is not a telephone number stored in the contact list of the first telephone, the first telephone may perform operation 202; when the telephone number is a telephone number stored in the contact list of the first telephone, the first telephone may perform operation 209.

The contact list may store telephone numbers that the user of the first telephone trusts. When the telephone number is not a telephone number stored in the contact list, it may be deemed that the telephone number is a strange telephone number, and operation 202 is performed.

In operation 202, the first telephone may determine whether a coding rule of the telephone number used by the caller conforms to a preset coding rule.

When the coding rule of the telephone number used by the caller conforms to the preset coding rule, operation 203 is performed; when the coding rule of the telephone number used by the caller does not conform to the preset coding rule, operation 210 is performed.

The preset coding rule may employ domestic and abroad telephone coding rules formulated by the telecom operator. When the coding rule of the telephone number does not conform to the preset coding rule, for example, when the telephone number is constituted of a series of numbers (such as "0123456789"), operation 210 is performed.

In operation 203, the first telephone may search a preset corresponding relationship between telephone numbers and their corresponding assigned entities and obtain the assigned entity corresponding to the telephone number that the caller uses.

Firstly, the first telephone may obtain the telephone number matching with the telephone number used by the caller in the preset corresponding relationship between telephone numbers and assigned entities. Then, when the telephone number matching with the telephone number used by the caller is obtained, the first telephone may determine the assigned entity corresponding to the telephone number matching with the telephone number used by the caller; when no telephone number matching with the telephone number used by the caller is obtained, the first telephone exit the flow chart.

The corresponding relationship between telephone numbers and assigned entities may include telephone numbers of entities (e.g., public institutions such as local police stations or courts, and famous enterprises and the like) open to the public. Criminals often masquerade as the telephone numbers of these entities to conduct fraudulent activities.

The first telephone may download the corresponding relationship between telephone numbers and assigned entities from specified servers. Manual collecting and entry may be used to store the corresponding relationship between telephone numbers and their corresponding assigned entities in the specified servers.

In operation 204, the first telephone may obtain the telephone number of the first telephone.

The first telephone may read its own telephone number from a SIM card, or may read its own telephone number by related technologies, and the present disclosure does not impose limitations on this.

In operation 205, the first telephone may send the telephone number used by the caller and the telephone number of the first telephone to a first server of the assigned entity.

The first server may be configured to determine a second telephone that is corresponding to the telephone number used by the caller, and then inquire and/or determine whether the second telephone is currently calling the telephone number of the first telephone.

After the first telephone obtains the assigned entity corresponding to the telephone number used by the caller, it may obtain the address of the first server of the assigned entity, and may send the telephone number used by the caller and the telephone number of the first telephone to the first server of the assigned entity via internet.

In operation 206, the first server may receive the telephone number used by the caller and the telephone number of the first telephone, and inquires whether the second telephone is currently calling the telephone number of the first telephone, and obtains an inquiry result.

The inquiry result may be either that the second telephone is indeed calling the telephone number of the first telephone or that the second telephone is currently not calling the telephone number of the first telephone currently.

The first server may be configured to manage operations of all telephones in the assigned entity. For example, the first server may be configured to manage operations of all telephones of a bank or police station. The first server may detect, among the managed telephones, a telephone which is under a working state, and may detect whether the telephone is currently calling a telephone number of a telephone.

The term "currently" herein may refer to the time when the first server receives the telephone number used by the caller and the telephone number of the first telephone.

In operation 207, the first server may return the inquiry result back to the first telephone.

The first server may return the inquiry result back to the first telephone via networks.

In operation 208, the first telephone may receive the inquiry result.

When the inquiry result is that the second telephone is calling the telephone number of the first telephone currently, the first telephone may perform operation 209; when the inquiry result is that the second telephone is not currently calling the telephone number of the first telephone, the first telephone may perform operation 210.

By operations 203 to 208, it is achieved that the first telephone determines whether the second telephone of the assigned entity, which entity the telephone number used by the caller is affiliated with, is calling the telephone number of the first telephone.

In operation 209, the first telephone may determine that the telephone call from the caller is not a number-falsified telephone call.

In operation 210, the first telephone may output and/display the prompt information indicating that the telephone call from the caller is a number-falsified telephone call.

When it is determined that the telephone call is a number-falsified telephone call, the first telephone may alert the user, for example by popping-up a window on the screen with the prompt information.

In the embodiment, when a caller is calling a telephone number of a first telephone, whether a second telephone of an assigned entity, which entity a telephone number used by the caller is affiliated with, is calling the telephone number of the first telephone is determined; the telephone number of the second telephone is the telephone number used by the caller; when the second telephone is not calling the telephone number of the first telephone, prompt information is output; the prompt information is for indicating that the telephone call from the caller is a number-falsified telephone call; since the second telephone of the assigned entity is the authentic source of the caller, the determination result about whether the second telephone of the assigned entity is calling the callee is real and effective, and thereby whether the telephone call is number-falsified telephone call may be correctly identified; meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

Figure 3:
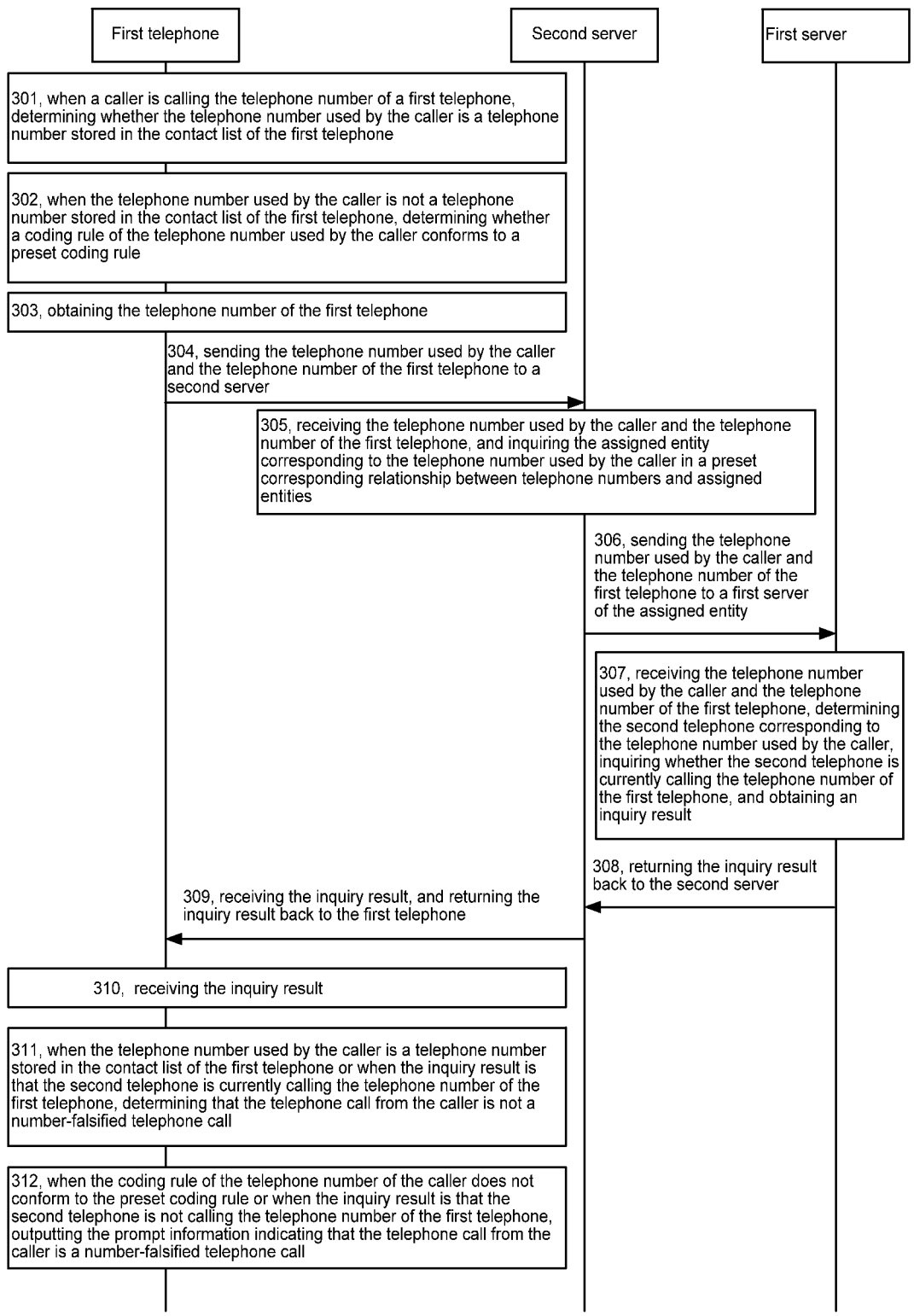
FIG. 3 is a flow chart showing another method for identifying an incoming telephone call according to an example embodiment of the present disclosure.

FIG. 3 is a flow chart showing a method for identifying an incoming telephone call according to an example embodiment. This method may be implemented in a first telephone, such as the device 800. The method may also be implemented in a server (e.g., a cloud server), such as the device 800 and/or the server 900, connecting to the first telephone to provide a service of identifying a telephone call. Merely for illustration, the below description takes an example that the method is implemented in the first telephone as an example. It should be note that the below method may also be implemented in a computer server, such as a cloud server. The method may include the following operations:

In operation 301, when a caller is calling a telephone number (i.e., the first phone number) of a first telephone, the first telephone may be notified with the phone call and determine whether the telephone number (i.e., the second phone number) used by the caller is a telephone number stored in the contact list of the first telephone.

When the telephone number used by the caller is not a telephone number stored in the contact list of the first telephone, the first telephone may perform operation 302; and when the telephone number used by the caller is a telephone number stored in the contact list of the first telephone, the first telephone may perform operation 311.

The first telephone may perform operation 301 in the same manner as operation 201.

In operation 302, the first telephone may determine whether a coding rule of the telephone number used by the caller conforms to a preset coding rule.

When the coding rule of the telephone number used by the caller conforms to the preset coding rule, the first telephone may perform operation 303; and when the coding rule of the telephone number used by the caller does not conform to the preset coding rule, the first telephone may perform operation 312.

The first telephone may perform operation 302 in the same manner as operation 202.

In operation 303, the first telephone may obtain the telephone number of the first telephone.

The first telephone may perform operation 303 in the same manner as operation 204.

In operation 304, the first telephone may send the telephone number used by the caller and the telephone number of the first telephone to a second server.

The first telephone may send the telephone number used by the caller and the telephone number of the first telephone to the second server via networks, such as the Internet, LANs, and/or WANs.

In operation 305, the second server may receive the telephone number used by the caller and the telephone number of the first telephone, and inquire the assigned entity corresponding to the telephone number used by the caller in the preset corresponding relation between telephone numbers and assigned entities.

The second server may first obtain a telephone number matching with the telephone number used by the caller from the preset corresponding relationships, then, when the telephone number matching with the telephone number used by the caller is obtained, the second server may obtain the corresponding assigned entity. When no telephone number matching with the telephone number used by the caller is obtained, the first telephone and/or the second server may exit the flow chart.

In operation 306, the second server may send the telephone number used by the caller and the telephone number of the first telephone to the first server of the assigned entity.

The second server may send the telephone number used by the caller and the telephone number of the first telephone to the first server of the assigned entity via networks, such as the Internet, LANs, and/or WANs.

In operation 307, the first server may receive the telephone number used by the caller and the telephone number of the first telephone, determine the second phone corresponds to the telephone number used by the caller, and then inquire whether the second telephone is indeed currently calling the telephone number of the first telephone, and obtain an inquiry result.

The inquiry result may be either that the second telephone is indeed calling the telephone number of the first telephone currently or that the second telephone is not calling the telephone number of the first telephone currently.

The telephone number of the second telephone is the telephone number used by the caller.

The first server may perform operation 307 in the same manner as operation 206.

In operation 308, the first server may return the inquiry result back to the second server.

The first server may return the inquiry result back to the second server via networks, such as the Internet, LANs, and/or WANs.

In operation 309, the second server may receive the inquiry result, and return and/or transmit the inquiry result back to the first telephone.

In operation 310, the first telephone may receive the inquiry result.

When the inquiry result is that the second telephone is calling the telephone number of the first telephone currently, the first telephone may perform operation 311; and when the inquiry result is that the second telephone is not calling the telephone number of the first telephone currently, the first telephone may perform operation 312.

By operations 303-310, determination about whether the second telephone of the assigned entity, which entity the telephone number used by the caller is affiliated with, is calling the first telephone is achieved.

In operation 311, the first telephone may determine the telephone call from the caller is not a number-falsified telephone call.

In operation 312, the first telephone may output and/or display prompt information indicating that the telephones call from the caller is a number-falsified telephone call.

When the first telephone determines that the telephone call is a number-falsified telephone call, the first telephone may prompt the user by outputting and/or displaying the prompt information, for example by popping-up window on a screen of the first telephone.

In the embodiment, when a caller is calling a telephone number of a first telephone, whether a second telephone of an assigned entity, which entity a telephone number used by the caller is affiliated with, is calling the telephone number of the first telephone is determined; the telephone number of the second telephone is the telephone number used by the caller; when the second telephone is not calling the telephone number of the first telephone, prompt information is output; the prompt information is for indicating that the telephone call from the caller is a number-falsified telephone call; since the second telephone of the assigned entity is the authentic source of the caller, the determination result about whether the second telephone of the assigned entity is calling the callee is real and effective, and thereby whether the telephone call is number-falsified telephone call may be correctly identified; meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

Figure 4:
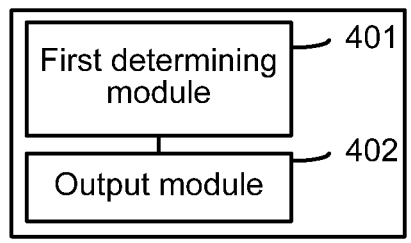
FIG. 4 is a block diagram showing a device for identifying an incoming telephone call according to an example embodiment of the present disclosure.

FIG. 4 is a schematic diagram showing a device for identifying a telephone call according to an example embodiment. The device may be mounted in and/or part of the first telephone, as shown in FIG. 4, and the device may include a first determining module 401 and an output module 402.

The first determining module 401 may be configured to determine whether a second telephone of an assigned entity, which entity a telephone number used by the caller is affiliated with, is calling the telephone number of the first telephone when the caller is calling the telephone number of the first telephone; the telephone number of the second telephone is the telephone number used by the caller.

The output module may be configured to, when the second telephone is not calling the telephone number of the first telephone, output prompt information for indicating that the telephone call from the caller is a number-falsified telephone call.

In the embodiment, when a caller is calling a telephone number of a first telephone, whether a second telephone of an assigned entity, which entity a telephone number used by the caller is affiliated with, is calling the telephone number of the first telephone is determined; the telephone number of the second telephone is the telephone number used by the caller; when the second telephone is not calling the telephone number of the first telephone, prompt information is output; the prompt information is for indicating that the telephone call from the caller is a number-falsified telephone call; since the second telephone of the assigned entity is the authentic source of the caller, the determination result about whether the second telephone of the assigned entity is calling the callee is real and effective, and thereby whether the telephone call is number-falsified telephone call may be correctly identified; meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

Figure 5:
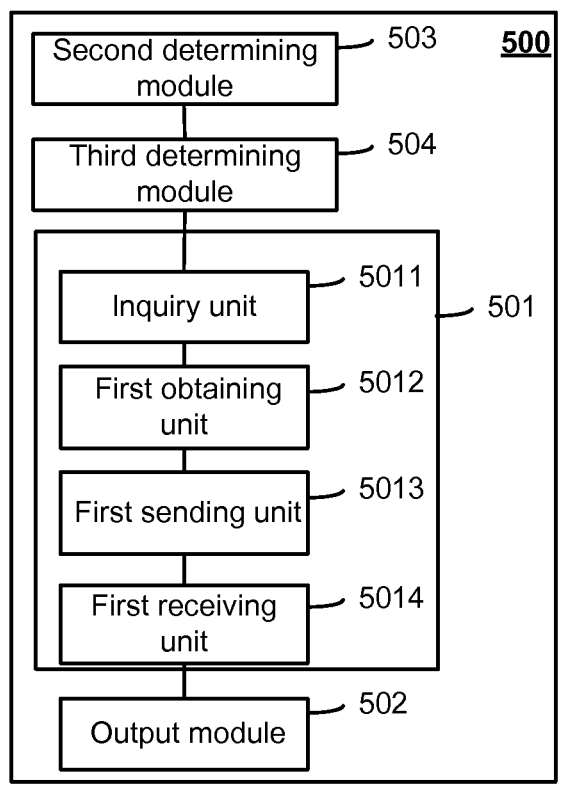
FIG. 5 is a block diagram showing another device for identifying an incoming telephone call according to an example embodiment of the present disclosure.

FIG. 5 is a schematic diagram showing a device 500 for identifying a telephone call according to an example embodiment. The device 500 may be mounted in or part of the first telephone, as shown in FIG. 5, and the device may include a first determining module 501 and an output module 502.

The first determining module 501 may be configured to determine whether a second telephone of an assigned entity, which entity the telephone number used by the caller is affiliated with, is calling a telephone number of a first telephone when the caller is calling the telephone number of the first telephone; the telephone number of the second telephone is the telephone number used by the caller.

The output module 502 may be configured to, when the second telephone is not calling the telephone number of the first telephone, output prompt information for indicating that the telephone call from the caller is a number-falsified telephone call.

In a first implementation of the embodiment, the first determining module 501 may include an inquiry unit 5011, a first obtaining unit 5012, a first sending unit 5013 and a first receiving unit 5014.

The inquiry unit 5011 may be configured to inquire the assigned entity corresponding to the telephone number used by the caller in a preset corresponding relationship between telephone numbers and assigned entities.

The first obtaining unit 5012 may be configured to obtain the telephone number of the first telephone.

The first sending unit 5013 may be configured to send the telephone number used by the caller and the telephone number of the first telephone to the first server of the assigned entity; the first server may be configured to inquire whether the second telephone is calling the telephone number of the first telephone currently.

The first receiving unit 5014 may be configured to receive an inquiry result returned back from the first server. The inquiry result may be either that the second telephone is calling the telephone number of the first telephone or that the second telephone is not calling the telephone number of the first telephone.

In a second implementation of the embodiment, the device 500 may further include a second determining module 503.

The second determining module 503 may be configured to determine whether the telephone number used by the caller is a telephone number stored in a contact list of the first telephone when the telephone call from the caller is received; when the telephone number used by the caller is a telephone number stored in the contact list of the first telephone, it is determined that the telephone call from the caller is not a number-falsified telephone call.

In a third implementation of the embodiment, the device 500 may further include a third determining module 504.

The third determining module 504 may be configured to, when the telephone number used by the caller is not a telephone number stored in the contact list of the first telephone, determine whether a coding rule of the telephone number used by the caller conforms to a preset coding rule; when the coding rule of the telephone number used by the caller does not conform to the preset coding rule, the third determining module 504 may output the prompt information.

In a fourth implementation of the embodiment, the first determining module 501 may further be configured to, when the coding rule of the telephone number used by the caller conforms to the preset coding rule, the first determining module 501 may determine whether the second telephone of the assigned entity, which entity the telephone number used by the caller is affiliated with, is calling the telephone number of the first telephone.

In the embodiment, when a caller is calling a telephone number of a first telephone, whether a second telephone of an assigned entity, which entity a telephone number used by the caller is affiliated with, is calling the telephone number of the first telephone is determined; the telephone number of the second telephone is the telephone number used by the caller; when the second telephone is not calling the telephone number of the first telephone, prompt information is output; the prompt information is for indicating that the telephone call from the caller is a number-falsified telephone call; since the second telephone of the assigned entity is the authentic source of the caller, the determination result about whether the second telephone of the assigned entity is calling the callee is real and effective, and thereby whether the telephone call is number-falsified telephone call may be correctly identified; meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

Figure 6:
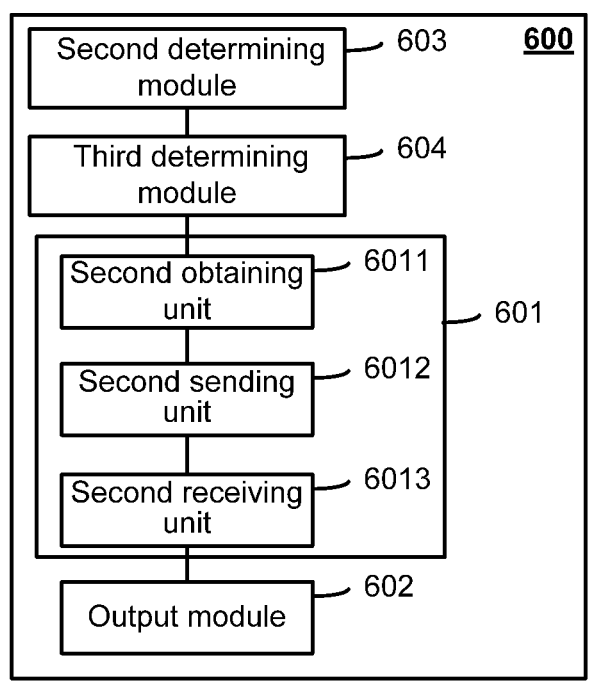
FIG. 6 is a block diagram showing another device for identifying an incoming telephone call according to an example embodiment of the present disclosure.

FIG. 6 is a schematic diagram showing a device 600 for identifying a telephone call according to an example embodiment. The device 600 may be mounted in and/or part of the first telephone, as shown in FIG. 6, and the device may include a first determining module 601, an output module 602, a second determining module 603 and a third determining module 604. The output module 602, the second determining module 603 and the third determining module 604 of this device 600 are of the same configuration as that of the output module 502, the second determining module 503 and the third determining module 504 in FIG. 5, and the descriptions thereof are omitted. The differences are as follows.

The first determining module 601 may include a second obtaining unit 6011, a second sending unit 6012, and a second receiving unit 6013.

The second obtaining unit 6011 may be configured to obtain the telephone number of the first telephone.

The second sending unit 6012 may be configured to send the telephone number used by the caller and the telephone number of the first telephone to a second server; the second server may be configured to determine whether the second telephone of the assigned entity, which entity the telephone number used by the caller is affiliated with, is calling the telephone number of the first telephone.

The second receiving unit 6013 may be configured to receive the inquiry result returned back by the second server. The inquiry result is that the second telephone is calling the telephone number of the first telephone or that the second telephone is not calling the telephone number of the first telephone.

In the embodiment, when a caller is calling a telephone number of a first telephone, whether a second telephone of an assigned entity, which entity a telephone number used by the caller is affiliated with, is calling the telephone number of the first telephone is determined; the telephone number of the second telephone is the telephone number used by the caller; when the second telephone is not calling the telephone number of the first telephone, prompt information is output; the prompt information is for indicating that the telephone call from the caller is a number-falsified telephone call; since the second telephone of the assigned entity is the authentic source of the caller, the determination result about whether the second telephone of the assigned entity is calling the callee is real and effective, and thereby whether the telephone call is number-falsified telephone call may be correctly identified; meanwhile, the identifying method is based on the telephone number used by the caller and confirms from the aspect of assigned entity but has no relation with the coding rule of telephone number, and thus the method is applicable in identification of all telephone numbers; furthermore, when it is identified that the telephone call is a number-falsified telephone call, a prompt is given to make the callee identify the incoming call when receiving the incoming call from the caller, and thereby the callee is prevented to be deceived.

Referring back to FIG. 7, the device 800 may be the first telephone that implements the above methods in the present disclosure. The memory 804 of the device 800 may be a non-transitory computer readable storage medium that stores a set of instruction for identifying the telephone call from the caller. When the set of instructions in the storage medium 804 is executed by the processor 820 of the device 800, the set of instructions may direct the processor 820 to perform a method for identifying the telephone call from the caller. The method may include:

Determining whether a second telephone of an assigned entity, which entity a telephone number of a caller is affiliated with, is calling a telephone number of a first telephone when the caller is calling the telephone number of the first telephone, wherein the telephone number of the second telephone is the telephone number used by the caller;

When the second telephone is not calling the telephone number of the first telephone, outputting prompt information for indicating that the telephone call from the caller is a number-falsified telephone call.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as example only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A device, comprising:
a processor-readable non-transitory storage medium storing a set of instructions for identifying an incoming telephone call; and
a processor in communication with the storage medium, wherein when a first telephone affiliated with a first telephone number receives an incoming telephone call from a second telephone number, the processor executes the set of instructions to:
determine whether a second telephone affiliated with the second phone number is in fact currently calling the first telephone number based on both the first telephone number and the second telephone number; and
when the second telephone is not calling the first telephone number, output information indicating that the incoming telephone call is a number-falsified telephone call.

2. The device according to claim 1, wherein the device is a cloud server.

3. The device according to claim 1, wherein the device is a server connecting to the first telephone to provide a service of identifying a telephone call.

4. The device according to claim 1, wherein the processor further executes the set of instructions to:
obtain the first phone number;
send the second phone number and the first phone number to a server associated with the second telephone to determine whether the second telephone is in fact calling the first phone number; and
receive from the server a result as to whether the second telephone is calling the first phone number.

5. The device according to claim 1, wherein the processor further executes the set of instructions to:
determine whether the second phone number is a telephone number stored in a contact list of the first telephone; and
determine that the incoming telephone call is not a number-falsified telephone call when the second phone number is a telephone number stored in the contact list of the first telephone.

6. The device according to claim 5, wherein the processor further executes the set of instructions to:
when the second phone number is not a telephone number stored in the contact list of the first telephone, determine whether the second phone number conforms to a preset coding rule;
when the second phone number does not conform to the preset coding rule, output the information indicating that the incoming telephone call is a number-falsified telephone call.

7. The device according to claim 5, wherein the processor further executes the set of instructions to determine whether the second telephone is calling the first telephone number when the second phone number conforms to the preset coding rule.

8. A method for identifying an incoming telephone call, comprising receiving, by an electronic device, a notification that a first telephone affiliated with a first telephone number receives an incoming telephone call from a second telephone number;
determining, by the electronic device, whether a second telephone affiliated with the second phone number is in fact currently calling the first telephone number based on both the first telephone number and the second telephone number; and
when the second telephone is not calling the first telephone number, outputting, by the electronic device, information indicating that the incoming telephone call is a number-falsified telephone call.

9. The method according to claim 8, wherein the electronic device is a cloud server.

10. The method according to claim 8, wherein the electronic device is a server connecting to the first telephone to provide a service of identifying a telephone call.

11. The method according to claim 8, further comprising:
obtaining, by the electronic device, the first phone number;
sending, by the electronic device, the second phone number and the first phone number to a server associated with the second telephone to determine whether the second telephone is calling the first phone number; and
receiving, by the electronic device, from the server a result as to whether the second telephone is calling the first phone number.

12. The method according to claim 8, further comprising:
determining, by the electronic device, whether the second phone number is a telephone number stored in a contact list of the first telephone; and
determining, by the electronic device, that the incoming telephone call is not a number-falsified telephone call when the second phone number is a telephone number stored in the contact list of the first telephone.

13. The device according to claim 12, further comprising:
when the second phone number is not a telephone number stored in the contact list of the first telephone, determining, by the electronic device, whether the second phone number conforms to a preset coding rule;
when the second phone number does not conform to the preset coding rule, outputting, by the electronic device, the information indicating that the incoming telephone call is a number-falsified telephone call.

14. The device according to claim 12, further comprising determining whether the second telephone is calling the first telephone number when the second phone number conforms to the preset coding rule.

15. A processor-readable non-transitory storage medium, comprising a set of instructions for identifying an incoming telephone call, wherein when executed by a processor the set of instructions directs the processor to perform acts of,
receiving a notification that a first telephone affiliated with a first telephone number receives an incoming telephone call from a second telephone number;
determining whether a second telephone affiliated with the second phone number is in fact currently calling the first telephone number based on both the first telephone number and the second telephone number; and
when the second telephone is not calling the first telephone number, output information indicating that the incoming telephone call is a number-falsified telephone call.

16. The storage medium according to claim 15, wherein the notification is received from the first telephone.

17. The storage medium according to claim 15, wherein the set of instruction further directs the processor to perform acts of:
  obtaining the first phone number;
  sending the second phone number and the first phone number to a server associated with the second phone number to determine whether the second telephone is in fact calling the first phone number; and
  receiving from the server a result as to whether the second telephone is calling the first phone number.

18. The storage medium according to claim 15, wherein the set of instruction further directs the processor to perform acts of:
  determining whether the second phone number is a telephone number stored in a contact list of the first telephone; and
  determining that the incoming telephone call is not a number-falsified telephone call when the second phone number is a telephone number stored in the contact list of the first telephone.

19. The storage medium according to claim 18, wherein the set of instruction further directs the processor to perform acts of:
  when the second phone number is not a telephone number stored in the contact list of the first telephone, determining whether the second phone number conforms to a preset coding rule;
  when the second phone number does not conform to the preset coding rule, outputting the prompt information.

20. The storage medium according to claim 18, wherein the set of instruction further directs the processor to perform acts of determining whether the second telephone is calling the first telephone number when the second phone number conforms to the preset coding rule.

21. A first telephone device affiliated with a first telephone number, comprising:
  a processor-readable non-transitory storage medium storing a set of instructions for identifying an incoming telephone call; and
  a processor in communication with the storage medium, wherein when the first telephone device receives an incoming telephone call from a second telephone number, the processor executes the set of instructions to:
    determine whether a second telephone affiliated with the second phone number is in fact currently calling the first telephone number based on both the first and telephone number and the second telephone number; and
    when the second telephone is not calling the first telephone number, output information indicating that the incoming telephone call is a number-falsified telephone call.

* * * * *